United States Patent
Cui et al.

(10) Patent No.: US 10,109,418 B2
(45) Date of Patent: Oct. 23, 2018

(54) SYSTEM AND PROCESS FOR FRICTION CONSOLIDATION FABRICATION OF PERMANENT MAGNETS AND OTHER EXTRUSION AND NON-EXTRUSION STRUCTURES

(71) Applicants: Jun Cui, Richland, WA (US); Glenn J. Grant, Benton City, WA (US); Saumyadeep Jana, Kennewick, WA (US); Yuri Hovanski, West Richland, WA (US); Curt A. Lavender, Richland, WA (US)

(72) Inventors: Jun Cui, Richland, WA (US); Glenn J. Grant, Benton City, WA (US); Saumyadeep Jana, Kennewick, WA (US); Yuri Hovanski, West Richland, WA (US); Curt A. Lavender, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 658 days.

(21) Appl. No.: 14/268,216

(22) Filed: May 2, 2014

(65) Prior Publication Data

US 2014/0328710 A1 Nov. 6, 2014

Related U.S. Application Data

(60) Provisional application No. 61/819,291, filed on May 3, 2013.

(51) Int. Cl.
*H01F 41/02* (2006.01)
*B29C 43/04* (2006.01)
(Continued)

(52) U.S. Cl.
CPC ........ *H01F 41/0266* (2013.01); *B29C 43/04* (2013.01); *B29C 43/34* (2013.01);
(Continued)

(58) Field of Classification Search
CPC ...... B29C 43/56; H01F 41/0266; B22F 3/093; B22F 3/20
See application file for complete search history.

(56) References Cited

U.S. PATENT DOCUMENTS 3,203,215 A * 8/1965 Jones .................... B21C 23/004
310/26
3,432,369 A  3/1969 Naastepad
(Continued)

OTHER PUBLICATIONS

Tang and Reynolds, "Friction Consolidation of Aluminum Chips," in Friction Stir Welding and Proceesing VI, Edited by: Rajiv Mishra, Murray W. Mahoney, Yutaka Sato, Yuri Hovanski, and Ravi Verma, TMS (The Minerals, Metals & Materials Society), 2011, pp. 289-298.*

(Continued)

*Primary Examiner* — Christopher S Kessler
(74) *Attorney, Agent, or Firm* — Derek H. Maughan

(57) ABSTRACT

A die tool and process are described that provide friction consolidation fabrication and friction consolidation extrusion fabrication products including permanent magnets, and other extrusion and non-extrusion structures. The present invention overcomes previous particle size, texture, homogeneity and density limitations in conventional metallurgy processes.

3 Claims, 11 Drawing Sheets

(51) Int. Cl.
*B29C 43/34* (2006.01)
*B29C 43/36* (2006.01)
*B29C 43/52* (2006.01)
*B29C 43/56* (2006.01)

(52) U.S. Cl.
CPC ............ *B29C 43/361* (2013.01); *B29C 43/52* (2013.01); *B29C 43/56* (2013.01); *B29C 2043/043* (2013.01); *B29C 2043/3433* (2013.01); *B29C 2043/3636* (2013.01); *B29C 2043/568* (2013.01)

(56) References Cited

U.S. PATENT DOCUMENTS

| | | |
|---|---|---|
| 3,640,657 A | 2/1972 | Rowe et al. |
| 3,661,726 A | 5/1972 | Denes |
| 3,684,593 A | 8/1972 | Benz et al. |
| 3,892,603 A | 7/1975 | Reid |
| 3,933,536 A | 1/1976 | Doser et al. |
| 3,977,918 A | 8/1976 | Paladino et al. |
| 3,989,548 A | 11/1976 | Morris |
| 4,585,473 A | 4/1986 | Narasimhan et al. |
| 4,778,542 A | 10/1988 | Clemens |
| 4,801,340 A | 1/1989 | Inoue et al. |
| 4,808,224 A | 2/1989 | Anderson et al. |
| 4,892,596 A | 1/1990 | Chatterjee |
| 4,985,085 A | 1/1991 | Chatterjee |
| 5,026,438 A | 6/1991 | Sakakibara et al. |
| 5,089,060 A | 2/1992 | Bradley et al. |
| 5,242,508 A | 9/1993 | McCallum et al. |
| 5,262,123 A * | 11/1993 | Thomas .............. B21C 23/22 419/41 |
| 5,283,130 A | 2/1994 | Bradley et al. |
| 5,437,545 A | 8/1995 | Hirai |
| 5,470,401 A | 11/1995 | McCallum et al. |
| 5,737,959 A | 4/1998 | Korbel et al. |
| 6,022,424 A | 2/2000 | Sellers et al. |
| 6,036,467 A | 3/2000 | Jameson |
| 6,940,379 B2 | 9/2005 | Creighton |
| 7,096,705 B2 | 8/2006 | Segal |
| 7,322,508 B2 | 1/2008 | Chang et al. |
| 8,313,692 B2 | 11/2012 | Somekawa et al. |
| 2004/0238501 A1 | 12/2004 | Kawazoe et al. |
| 2006/0005898 A1 | 1/2006 | Liu et al. |
| 2008/0202653 A1 | 8/2008 | Ignberg |
| 2010/0059151 A1 | 3/2010 | Iwamura et al. |
| 2011/0057756 A1 * | 3/2011 | Marinescu .............. B22F 1/007 335/302 |
| 2012/0168045 A1 | 7/2012 | Ihara et al. |
| 2014/0002220 A1 | 1/2014 | Johnson et al. |
| 2014/0102161 A1 | 4/2014 | Stewart |

OTHER PUBLICATIONS

Glenn Grant et al., Low Cost Fabrication of ODS Alloys, DOE FE ARM Annual Review Meeting Pittsburgh, Pennsylvania Apr. 19, 2012.*

Rodewald, W., et al., Top Nd—Fe—B Magnets with Greater Than 56 MGOe Energy Density and 9.8 kOe Coercivity, IEEE Transactions on Magnetics, vol. 38, No. 5, Sep. 2002, 2955-2957.

Saha, P. K., Aluminum Extrusion Technology, Chapter 1, Fundamentals of Extrusion, The Materials Information Society, ASM International, Materials Park, OH 2000, 1-29.

Abu-Farja, F., A preliminary study on th feasibility of friction stir back extrusion, Scripta Materialia, 66, 2012, 615-618.

Office Action for U.S. Appl. No. 14/222,468, filed Mar. 21, 2014, First Named Inventor Curtis A. Lavender, Notification dated Nov. 6, 2015.

Office Action for U.S. Appl. No. 14/268,220, filed May 2, 2014, First Named Inventor Jun Cui, Notification dated Dec. 1, 2015.

* cited by examiner

SYSTEM AND PROCESS FOR FRICTION CONSOLIDATION FABRICATION OF PERMANENT MAGNETS AND OTHER EXTRUSION AND NON-EXTRUSION STRUCTURES

CROSS REFERENCE TO RELATED APPLICATION

This application claims priority from U.S. Provisional Application No. 61/819,291 filed 3 May 2013, which reference is incorporated herein in its entirety.

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

FIELD OF THE INVENTION

The present invention relates generally to magnet manufacturing and extrusion tools and processes. More particularly, the invention includes a combined friction consolidation and extrusion die tool and process for fabrication of permanent magnets.

BACKGROUND OF THE INVENTION

A magnet is an energy-storage device. A magnet is energized when it is first magnetized. The energy remains in the magnet indefinitely when properly made and properly handled. Unlike batteries, magnetic energy is not drained away because magnets do not perform any (net) work on their surroundings. Thus, the energy is always available for use. Performance of a permanent magnet may be described by such key parameters as coercivity, saturation magnetization, remanent magnetization, energy product, permeability, electrical resistivity, temperature coefficient and mechanical properties such as tensile and fracture strength. Strong magnets typically contain a combination of rare earth elements (RE) and transition metals including, e.g., $RCo_5$, $R_2Co_{17}$, and $Fe_{14}R_2B$, where R=Yttrium (Y), Lanthanum (La), Cerium (Ce), Praseodymium (Pr), Neodymium (Nd), and/or Samarium (Sm). Strongest room temperature permanent magnets include a compound with chemical formula $Fe_{14}Nd_2B$. Extra Nd is often added to improve mechanical properties. While most of the rare earth elements are not rare, a shortage currently exists for some rare earth elements, in particular, neodymium (Nd) and dysprosium (Dy) due principally to world-wide demand for magnets used in motors and generators. However, costs for manufacturing magnets in the U.S. are higher than those in China and Japan due to higher purchase prices for these rare earth elements and/or technology licensing costs. Consequently, magnet manufacturing has largely moved from the U.S. Currently, there is concern in the U.S. that growth in wind-based power generation and electric vehicle technology, which require high-performance rare earth magnets, may be stifled by a lack of economically-competitive electric generators and motors because of the high cost of key magnetic components. Thus, there is a growing desire to develop alternative magnetic materials that employ a lower quantity of rare earth elements and new cost-effective processing technologies to mitigate reliance on foreign sources. Conventional methods for manufacturing permanent magnets involve powder metallurgy processes that include such steps as ingot casting, powder preparation through pulverization (e.g., via grinding or jet milling), aligning powdered materials in a strong magnetic field, compacting, hot pressing and/or sintering, sizing, finishing with protective coatings, and magnetization of the bulk magnets. However, conventional powder metallurgy processes are both energy-intensive and time-intensive and often waste large amounts of materials during sizing and shaping. And, these powder metallurgy processes also have limited ability to attain desired microstructure and bulk density values. Because performance of permanent magnets is directly related to the microstructure, grain size, crystallographic orientation of the grains, phase distribution within the grains and on the grain boundaries, and bulk density of the magnetic material are key elements to attaining high magnetic performance. Magnetic performance is characterized by a high remnant magnetization value, a high coercivity value, and a high energy product value. One key to maintaining high performance-to-weight ratios in traction motors and wind generators is to employ stronger magnets. It has been established by micro magnetics theory and thin film experimental work that only textured and exchanged-coupled nanocomposite permanent magnets have the potential to exceed the energy product of current state-of-the-art magnets such as NdFeB magnets. Such magnets would be constructed of composites composed of a hard magnetic phase material that provides a high coercivity but limited magnetization, and a soft magnetic phase material that provides a high magnetization but a limited coercivity. However, while the architecture of exchange-coupled nanocomposites has been worked out theoretically, technical challenges have prevented the theoretical concepts being put into practice. For example, according to theory, magnetically-hard phase materials (with particles of a size between 20 nm and ~100 nm) must be homogenously mixed with the magnetically-soft phase (with particles of a size between 3 nm and ~15 nm). And, the phases must be metallically bonded for the exchange-coupling field to distribute readily through grains of the material. In addition, the hard phase must be textured such that the crystallographic orientation of a majority of grains is aligned along the magnetic-easy axis. However, conventional powder metallurgy involves several energy-intensive steps, so particles with sizes at or below 100 nm are not produced economically. Further, conventional powder metallurgy does not generally achieve homogeneous mixing between the soft magnetic phase materials and the hard magnetic phase materials needed to produce a uniform exchange coupling. Accordingly new processes are needed for economical manufacturing of permanent magnets that overcome particle size, homogenous mixing, texture, and metallic bonding limitations of conventional processes, and that further achieve green densities greater than 95%. The present invention addresses these needs.

SUMMARY OF THE INVENTION

The present invention includes a system (die tool) and process for friction consolidation fabrication of various structures including permanent magnets and other extrusion and non-extrusion structures. The die tool may include a containment die with a chamber configured to contain the selected process material. The containment die may be a rotatable containment die that is configured to rotate the selected process material introduced into the chamber of the containment die. The die tool may include a die fixture that secures the containment die to the system frame. The die tool may include an electromagnetic coil that surrounds the containment die that is configured to deliver a selected magnetic field through the selected process material. The die tool may also include one or more plunge tools that are configured to compress and/or rotate the process material in the containment die at a selected compression load and a selected rotation speed. The plunge tools may be rotatable or non-rotatable. The die tool frictionally consolidates the selected process material and yields material grains with a size less than or equal to about five microns (5 μm) that are aligned along a selected crystallographic axis. The compression and rotation yield a selected stress and strain distribution that flows and aligns grains of the selected process material in a selected 3-D crystallographic pattern.

The die tool and its components including the containment die and the plunge tools may be constructed of or include steel alloys (e.g., H-13 tool steel), hardened tool steels, INCONEL® alloys, aluminum alloys, titanium alloys, nickel alloys, tungsten alloys, rhenium-tungsten alloys, superalloys, other high-strength alloys including combinations of these various materials.

The present invention also includes another die tool for friction consolidation fabrication. The die tool may include: a rotatable containment die configured to rotate selected materials introduced in the chamber of the containment die. The die tool may include a drive set and a gear set that secure the rotatable containment die to the system frame and rotate the materials in the containment die.

Friction consolidation of the present invention may be performed on various selected materials at selected compression loads, rotation speeds, selected extrusion rates, and at temperatures above 500° C. described herein. Materials selected for processing may include, but are not limited to, e.g., magnet-forming materials, hard magnetic materials, soft magnetic materials, aluminum-containing extrusion materials; aluminum-containing alloys; magnesium-containing extrusion materials; magnesium-containing alloys; thermoelectric materials; net-shape extrusion materials; oxide dispersion strengthened (ODS) steels; creep resistant steels; non-equilibrium materials; high entropy materials; metal matrix composite (MMC) materials; non-conductive composite materials, including combinations of these various materials.

Magnet-forming materials may include elements selected from, e.g., nickel (Ni), titanium (Ti), tungsten (W), rhenium (Re), cobalt (Co), iron (Fe), manganese (Mn), bismuth (Bi), aluminum (Al), lanthanum (La), magnesium (Mg), samarium (Sm), neodymium (Nd), boron (B), dysprosium (Dy), yttrium (Y), cerium (Ce), copper (Cu), rhodium (Rh), silicon (Si), molybdenum (Mo), niobium (Nb), and combinations of these various elements. In some applications, magnet-forming materials may include one of: $Nd_2Fe_{14}B$, $SmCo5$, $Sm_2Co_{17}$, MnBi, MnAl, or AlNiCo. In some applications, magnet-forming materials may include two or more materials selected from: $Nd_2Fe_{14}B$, $SmCo_5$, $Sm_2Co_{17}$, MnBi, MnAl, AlNiCo, Fe, Co, Ni, FeB, CoC, FeCo, or FeCo alloys. In some applications, magnet-forming materials may include Nd, Fe, B, Y, Ti, Co, Nb, Cu, and Zr in selected ratios that form NdFeB-based permanent magnets. In some applications, magnet-forming materials may include Mn, Bi, Fe, Co, FeCo in selected ratios that form MnBi-based permanent magnets. In some applications, magnet-forming materials may include Sm, Fe, Co, FeCo, B, Zr, and Nb in selected ratios that form SmCo-based permanent magnets. In some applications, magnet-forming materials may include Sr, Ba, Co, Fe, and O in selected ratios that form ferrite-based permanent magnets. In some applications, magnet-forming materials may include Fe, Si, B, Nb, and Cu in selected ratios that form FeSi based soft magnets. In some applications, magnet-forming materials may include Fe, Ni, and Mo in selected ratios that form NiFeMo based soft magnets.

Selected process materials may be in the form of solid ingots, powders with particles or grains of any size, green (i.e., non-sintered) compact powders, amorphous solids, and/or polycrystalline solids.

Compression and rotation may be performed with one or more rotatable plunge tools that compress and rotate the selected material within the containment die. Rotation of the selected material within the containment die may also be performed by rotating the containment die or by rotating both the plunge tools and the containment die at different rotation speeds relative to the other. In various applications, compression and rotation may be performed simultaneously or in series. In various applications, rotation may be performed before, during, or after compression or vice versa.

The process may include mixing powders or components of the selected materials together to form a homogeneous mixture prior to compressing and rotating the selected material.

Rotation speeds for friction consolidation processing may be selected up to about 1000 revolutions-per-minute (rpm).

Compression loads for friction consolidation processing may be selected between about 50 psi (0.34 MPa) and about 5,000,000 psi (3.4E+03 MPa). In some applications, compression may include applying a compression load of about 5,000 pound-force (lbf). In some applications, compression may include applying a compression load of about 10,000 pound-force (lbf). Compression loads may be constant or variable.

The present invention overcomes particle size, texture, homogeneity, and density limits imposed by conventional metallurgy processes by consolidating and deforming selected process materials at near the re-crystallization temperature.

Process temperatures for friction consolidation processing may be greater than or equal to about 500° C. and below the melting temperature of the process material.

Rotatable and non-rotatable plunge tools may be configured to compress, agitate, and rotate the selected material in the containment die at a selected compression load that frictionally heats the selected material at a temperature below the melting temperature that consolidates the selected material.

The process may include compressing the selected material under a compression load while rotating the selected material relative to the loading axis at a rotation speed selected to frictionally consolidate the selected material. The process may produce permanent magnets with desired grain sizes, crystallographic textures, and densities.

The process may include a forward extrusion or a backward extrusion that involves pressing the consolidated material through an orifice in the containment die (forward extrusion) or an orifice in the plunge tool (backward extrusion). In some applications, rotatable plunge tools may include an orifice that allows consolidated materials to extrude via a backward extrusion process. In some applications, rotatable containment dies may include an orifice that allows consolidated materials to extrude via a forward extrusion process. The orifice of rotating containment dies or the orifice of plunge tools may include features that control crystallographic orientations of grains of materials that are extruded.

Compression and rotation may generate a selected stress and strain distribution that causes the selected material to flow that yields a selected 3-D crystallographic pattern. When flowed, the selected material may or may not be subjected to re-crystallization. Formation of 3-dimensional (3D) crystallographic patterns can stem from either a strain field or a magnetic field-biased re-crystallization, or from plastic deformation along preferred crystallographic directions.

Frictional consolidation of the selected material may include heating or cooling the selected material at temperatures that control the size and the orientation of the material grains that are formed.

The die tool may include a cooling device or system (e.g., chillers) configured to remove heat from the selected process material during and/or after consolidation and extrusion to control the size of grains in the selected material. The cooling device or system may include coils made of selected alloys such as aluminum or copper, and water pumps that circulate a cooling medium including water or another cooling medium. The cooling device or system may include one or more nozzles that spray a cooling medium selected from water, air, nitrogen gas, argon gas, $CO_2$ gas, liquid nitrogen, liquid $CO_2$, and combinations thereof.

In some applications, the process may include cooling the consolidated material while in a magnetic field to yield material grains that are aligned in selected crystallographic orientations.

In some applications, the selected material is a magnet-forming material that may be consolidated, extruded, and cooled in a magnetic field to control grain size and crystallographic orientation of the grains of the resulting permanent magnet. In some applications, the process may include rapidly cooling the magnet-forming material to control the grain growth and the grain orientation during and after consolidation and extrusion.

The containment die may be positioned at the center of an electromagnetic coil. The electromagnetic coil may provide selected magnetic fields that energize the permanent magnets obtained. In some applications, the rotatable containment die may be placed at the center of the electromagnetic coil. The electromagnetic coil may generate a magnetic field greater than 0.2 T.

The process may include applying a magnetic field to the magnet-forming material along the compression load direction or along the extrusion direction to form desired crystallographic textures. The magnetic field may be applied before, during, or after the compression and/or rotation and/or consolidation of the magnet-forming material. The applied magnetic field may be a pulsed magnetic field or a constant magnetic field. The magnetic field may be generated using an electromagnet or permanent magnets.

An ultrasonic field may be applied to the magnet-forming material to promote alignment of particles of the magnet-forming material in the magnetic field. The ultrasonic field may be applied before or during the compression and/or rotation of the magnet-forming material. In some applications, rotatable containment dies may be coupled to an ultrasonic source configured to deliver ultrasound into the magnetic-forming material at selected ultrasonic frequencies to agitate and to help particles of the magnet-forming material to align in the magnetic field along the magnetocrystalline easy axis.

The process may include coating the permanent magnet with a nickel (Ni) or other coating after consolidation to prevent oxidization and corrosion of the permanent magnet.

In some applications, the magnet-forming material may exhibit an energy product after friction consolidation and extrusion greater than 5 MGOe at room temperature. In some applications, the magnet-forming material may exhibit an energy product after friction consolidation and extrusion greater than 50 MGOe at room temperature.

In some applications, the magnet-forming material may have a coercivity value after consolidation greater than 1000 Oe (Oersted) and a saturation magnetization value greater than 0.6 Tesla. In some applications, the magnet-forming material may have a coercivity value after consolidation greater than 10,000 Oe and a saturation magnetization value greater than 1 Tesla.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Friction consolidation and extrusion systems and processes are disclosed for fabricating permanent magnets and other extrusion and non-extrusion structures that control the microstructure, texture, size, and crystallographic orientations of grains and the distribution of phases in the consolidated material. In the following description, embodiments of the present invention are shown and described by way of illustration of the best mode contemplated for carrying out the invention. It will be clear that the invention is susceptible of various modifications and alternative constructions. The present invention covers all modifications, alternative constructions, and equivalents falling within the spirit and scope of the invention as defined in the claims. Therefore the description should be seen as illustrative and not limiting.

Figure 1:
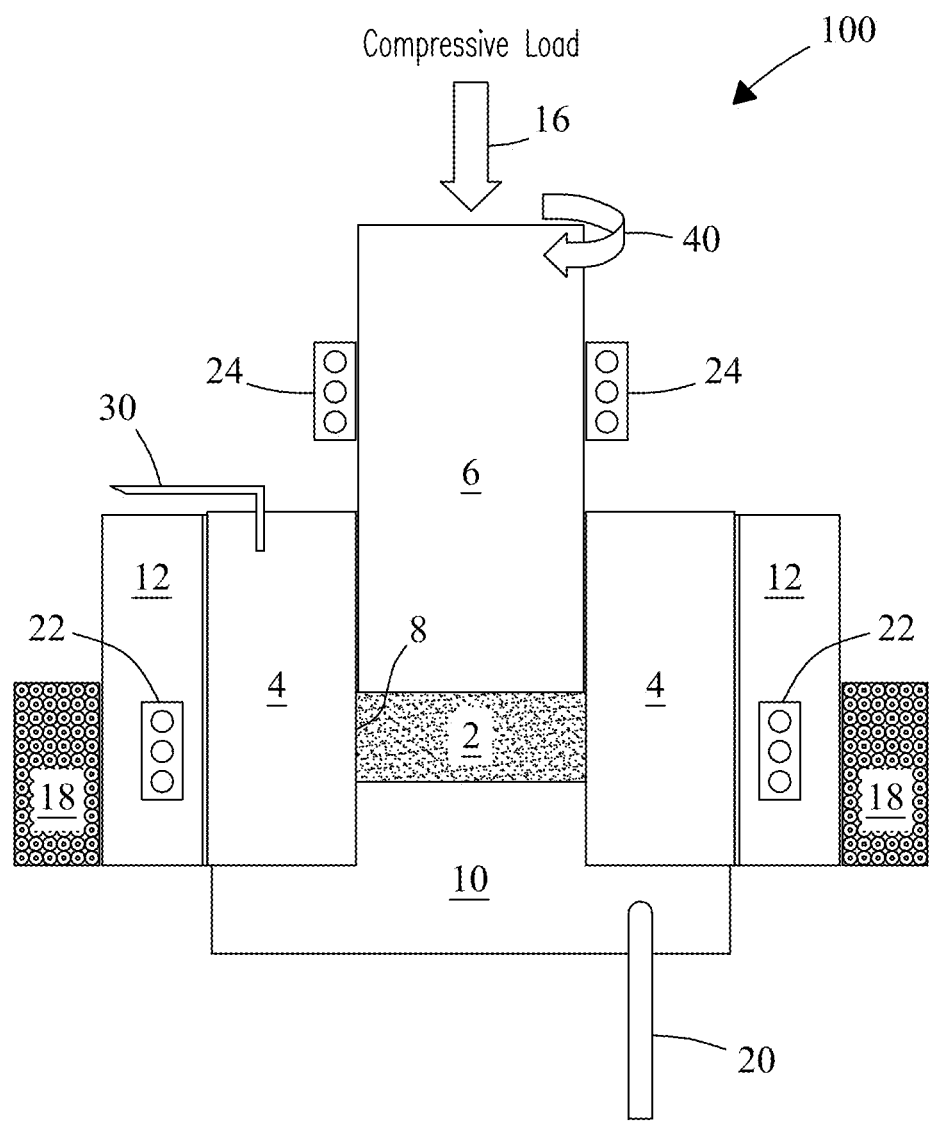
FIG. 1 shows a cross-sectional view of an exemplary die tool of the present invention for friction consolidation fabrication of permanent magnets and other non-extrusion structures, according to one embodiment of the present invention.

FIG. 1 shows a friction consolidation system (die tool) 100 of the present invention for friction consolidation of selected process materials 2. Consolidation products may be used to fabricate products including, e.g., permanent magnets, extrusion structures, and non-extrusion structures. Process materials 2 suitable for use include, but are not limited to, e.g., magnet-forming materials, hard magnetic materials, soft-magnetic materials, aluminum-containing materials including aluminum-containing extrusion materials; aluminum-containing alloys; magnesium-containing extrusion materials including magnesium-containing extrusion materials; magnesium-containing alloys; thermoelectric materials; net-shape and near net-shape materials including net-shape extrusion materials; oxide dispersion strengthened (ODS) steels; creep resistant steels; non-equilibrium materials; equil-angle materials including equil-angle extrusion materials; high entropy materials; metal matrix composite (MMC) materials; non-conductive composite materials, and combinations of these various materials. Magnet-forming materials may include or be composed of one or more different materials or constituents in a composite mixture. Each constituent in a composite mixture may include a same, a different, or various ratios when compared against another constituent in the composite. No limitations are intended.

In some embodiments, selected process material 2 may be a magnet-forming material used to fabricate permanent magnets. Magnet-forming materials may include on or more elements selected from: aluminum (Al), boron (B), bismuth (Bi), carbon (C), cerium (Ce), copper (Cu), cobalt (Co), Dysprosium (Dy), iron (Fe), magnesium (Mg), manganese (Mn), nickel (Ni), lanthanum (La), niobium (Nb), neodymium (Nd), praseodymium (Pr), rhenium (Re), rhodium (Rh), samarium (Sm), titanium (Ti), tungsten (W), yttrium (Y), zirconium (Zr), and combinations of these various elements. In some embodiments, magnet-forming materials may include one of: $Nd_2Fe_{14}B$, $SmCo5$, $Sm_2Co_{17}$, MnBi, MnAl, or AlNiCo. In some embodiments, the magnet-forming material may include selected ratios of Nd, Fe, and B that forms a NdFeB permanent magnet. In some embodiments, the magnet-forming material may include selected ratios of Mn, Bi, Fe, and Co that form a MnBiFeCo permanent magnet. In some embodiments, the magnet-forming material may include two or more of: $Nd_2Fe_{14}B$, $SmCo5$, $Sm_2Co_{17}$, MnBi, MnAl, AlNiCo, Fe, Co, Ni, FeB, FeN, FeCo, or FeCo alloys. In some embodiments, the magnet-forming materials may be in powder form. In some embodiments, powders may be compressed and agitated (i.e., mixed or forced) in a regular or irregular motion at selected rotation speeds. In some embodiments, magnet-forming materials may be in the form of one or more green (non-sintered) consolidated solids. In some embodiments, magnet-forming materials may be in the form of one or more polycrystalline solids or amorphous solids. All materials as will be selected by those of ordinary skill in the art in view of the disclosure are within the scope of the present invention. No limitations are intended.

Die tool 100 may include a containment die 4 and plunge (compression) tools 6 constructed of steel alloys (e.g., H-13 tool steel), hardened tool steels, INCONEL® alloys, aluminum alloys, titanium alloys, nickel alloys, tungsten alloys, rhenium-tungsten alloys, superalloys, other high-strength alloys including combinations of these materials that maintain sufficient strength and integrity at compression loads greater than 300 MPa at elevated temperature (>300° C.) without external cooling. If external cooling is employed, containment die 4 may also be constructed of normal tool steels and alloys.

Containment die 4 may include a chamber 8 configured to contain a selected process material 2 for consolidation processing. Chamber 8 may include a base plug 10 that inserts into containment die 4 to contain process material 2 within chamber 8. Base plug 10 may be constructed of, e.g., a tungsten alloy or another refractory alloy. Containment die 4 when assembled may be secured to a system frame (not shown) with one or more die fixtures 12 described further in reference to FIG. 2.

Compression plunge tools 6 that apply compression to process material 2 during operation. Plunge tools 6 may be rotatable or non-rotatable. Plunge tools 6 may be introduced into chamber 8 of containment die 4 to compress and/or rotate selected process material 2 within chamber 8. Material 2 may be introduced into chamber 8 in any form that permits compression and/or rotation of material 2 when introduced into chamber 8 of containment die 4. Materials 2 may be in various non-limiting forms including, e.g., solids, mixtures, composites, powder composites, powder mixtures, particles and granules of various sizes, green compacts composed of various powders, polycrystalline solids, etc. including combinations of these various material forms. No limitations are intended.

In the instant embodiment, plunge tools 6 of die tool 100 may be rotated during operation while containment die 4 remains stationary. Plunge tools 6 may be configured to compress selected material 2 in chamber 8 within containment die 4 under a selected compression load, and/or to rotate material 2 at a selected rotation speed that frictionally heats material 2 at a temperature at or above about 500° C. and below the melting temperature of the selected material 2.

In various embodiments, plunge tools 6 may be configured to rotate material 2 in chamber 8 at a rotation speed up to about 1000 rpm. In some embodiments, material 2 may be rotated at a selected rotation speed while being compressed at a selected compression load described further herein. Compression and/or rotation provided by plunge tools 6 serve to consolidate process materials 2 as detailed hereafter.

Die tool 100 may include a magnetic field generator 18 such as an electromagnetic coil 18 configured to deliver a selected magnetic field at various selected field strengths through the process material 2 in chamber 8 of containment die 4. In some embodiments, containment die 4 may be positioned at the center of electromagnetic coil 18. In some embodiments, process material 2 may be a magnet-forming material. Electromagnetic coil 18 may deliver a magnetic field with a flux density of greater than about 500 Oe into the magnet-forming material positioned within chamber 8 of containment die 4. The magnetic field may promote alignment of particles and grains of process material 2 before consolidation or during consolidation, and/or to promote grain growth along selected crystallographic directions following consolidation. In some embodiments, grains of the magnet-forming material may be aligned along the magnetic easy axis. In some embodiments, magnet-forming material 2 may be rotated and/or compressed while in the magnetic field.

Die tool 100 may also include an ultrasound generator or source 20 such as an ultrasonic horn 20 that may be coupled to containment die 4 to deliver ultrasound at selected ultrasonic frequencies and energies into process material 2 to promote alignment of grains of the process material 2. In some embodiments, material 2 in containment die 4 may be a magnet-forming material. In some embodiments, the ultrasound and magnetic field may be applied individually or separately to promote alignment of material grains in the process materials. In some embodiments, the ultrasound and magnetic field may be applied together to enhance the alignment of material grains in the process materials.

Die tool 100 may also include a cooling system or device 22 configured to actively cool or maintain temperature control of materials 2 within containment die 4. Cooling system or device 22 may include coils, channels, conduits or tubes constructed of conducting metals such as aluminum and copper or other structures (not shown) that circulate cooling fluids to cool containment die 4 and/or plunge tools 6 during consolidation operation. Cooling fluids include, but are not limited to, e.g., water, ethanol, liquid nitrogen, combinations of these fluids, or another cooling medium. No limitations are intended. All components as will be selected by those of ordinary skill in the art in view of the disclosure are within the scope of the present invention. No limitations in operation or configuration are intended.

Figure 2:
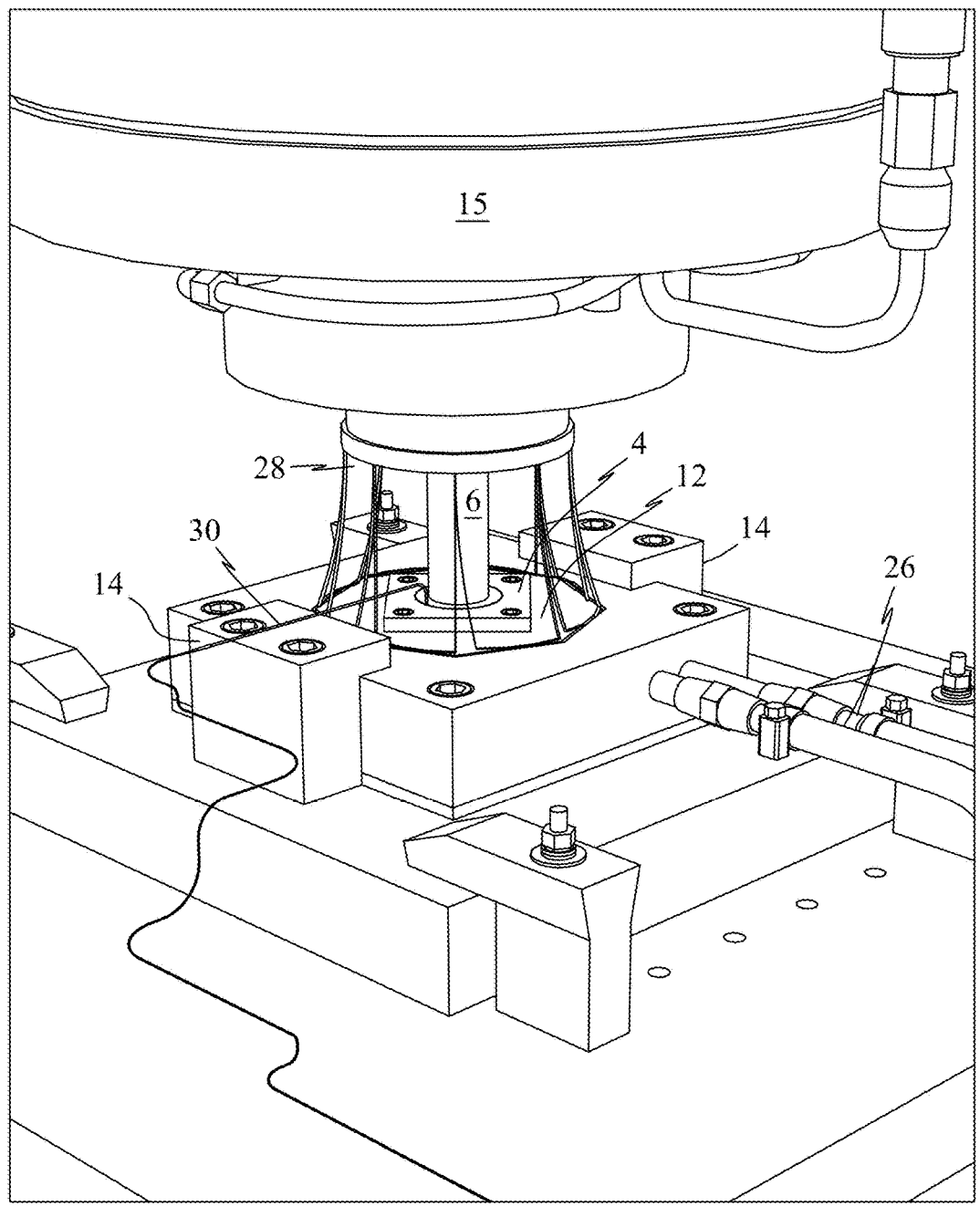
FIG. 2 shows a top perspective view of the exemplary die tool of FIG. 1.

FIG. 2 shows an exemplary setup for friction consolidation system 100 described previously in reference to FIG. 1. In the figure, containment die 4 may be secured in position with a die fixture 12 that mounts within a system frame 14. System frame 14 may include one or more tunnels (not shown) that deliver a cooling medium (not shown) such as water through system frame 14 that cool containment die 4 during operation. Cooling media may be delivered, e.g., through cooling conduits 26 that couple to system frame 14 as shown.

System 100 may include one or more plunge tools 6 described previously in reference to FIG. 1 that compress a process material (not shown) when the plunge tool is introduced into the material chamber (FIG. 1) in containment die 4. The compression load may be delivered, e.g., by a plunge tool compression load and gear drive assembly 15 mounted above plunge tool 6 as shown. Plunge tools 6 and containment die 4 may be enclosed within a shroud 28 that fills with a protective gas such as argon (Ar), argon-hydrogen mixtures (e.g., Ar-4% H), helium (He), nitrogen (N), and nitrogen-hydrogen mixtures (e.g., N-4% H) that protect the process material from oxidization during operation. In the exemplary embodiment, the material chamber has a diameter dimension of 1 inch (2.54 cm) and a depth of about 0.5 inches (1.3 cm), with a sample capacity (volume) of about 0.39 $in^3$ (6.4 $cm^3$). However, dimensions and sample capacities are not limited. In the figure, containment die 4 may also include a thermocouple 30 or temperature probe positioned to measure temperatures of the process materials (FIG. 1) in the material chamber during processing.

Figure 3:
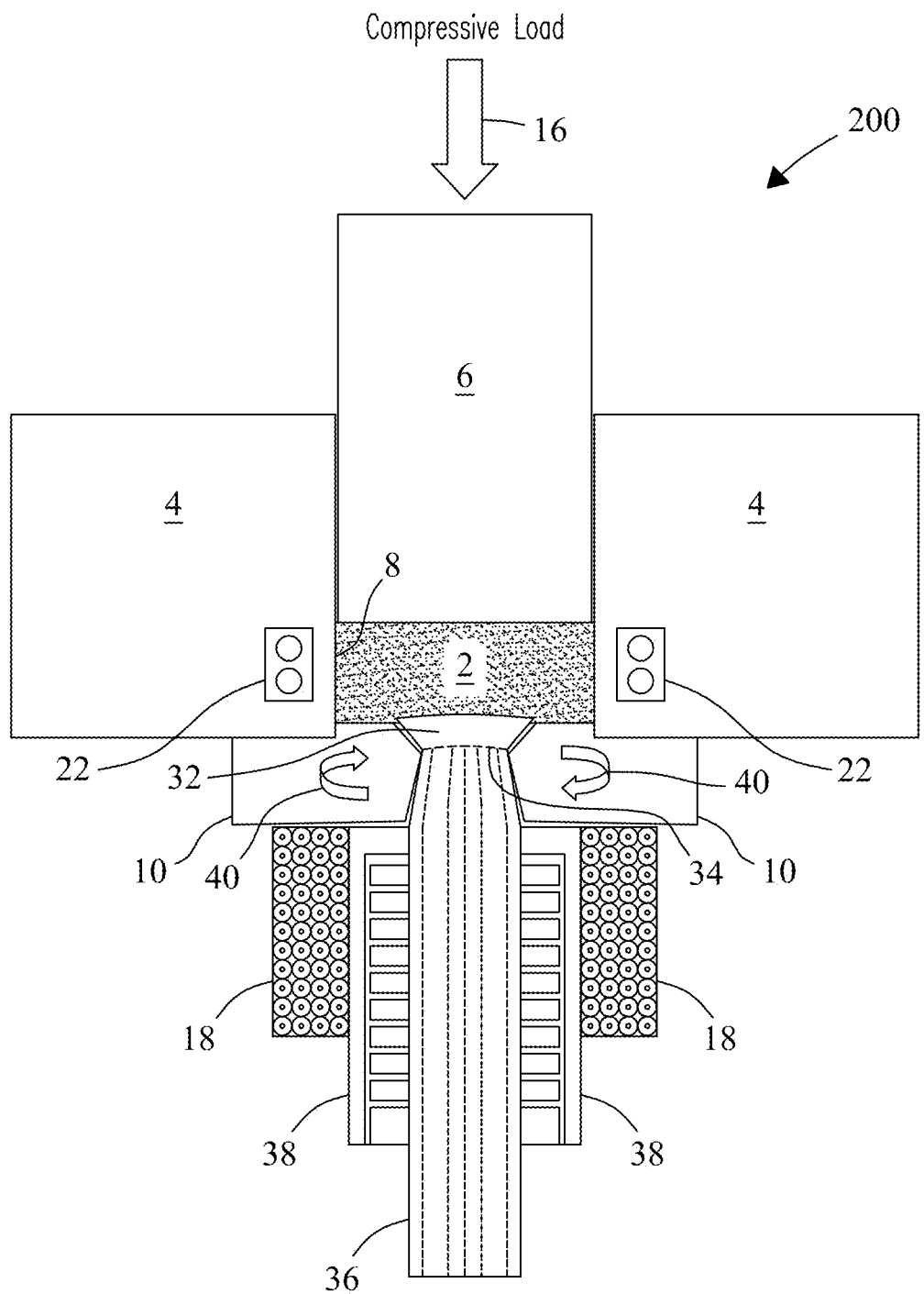
FIG. 3 shows a cross-sectional view of another exemplary die tool for friction consolidation and extrusion fabrication of permanent magnets and other extrusion structures, according to another embodiment of the present invention.

FIG. 3 shows another system (die tool) 200 of the present invention for friction consolidation fabrication of consolidation products including, e.g., permanent magnets, extrusion structures, and non-extrusion structures in accordance with the present invention. Die tool 200 may include a containment die 4, one or more plunge tools 6, an electromagnetic coil 18, and a die cooling system or device 22 described previously in reference to FIG. 1. In the instant embodiment, containment die 4 may be a rotatable containment die that rotates at selected rotation speeds that delivers a shear force 40 into the process material 2. Plunge tools 6 may also be rotatable plunge tools 6. Containment die 4 and plunge tools 6 may provide rotation of process material 2 introduced into containment die 4 individually or in combination at selected rotation speeds. For example, in some embodiments, containment die 4 and plunge tool 6 may be rotated at selected rotation speeds relative to the other component or vice versa to provide rotation of process material 2.

In some embodiments, electromagnetic coil 18 may be positioned around containment die 4. In some embodiments, electromagnetic coil 18 may be placed outside of extrusion cooling system 22 to apply a magnetic field to extruded, consolidated process materials including, e.g., consolidated magnet-forming materials.

In some embodiments, containment die 4 may include an extrusion die 32 with an extrusion orifice 34 that provides extrusion of consolidated process materials from containment die 4, as shown that yields selected extrusion products and structures 36 with selected shapes, as detailed hereafter. Die tool 200 may also include an extrusion product cooling system or device 38 with channels or nozzles that deliver a selected cooling medium that cools the extrusion product 36 as it extrudes through extrusion die 32.

In some embodiments, electromagnetic coil 18 may be positioned so as to directly surround extruded consolidated materials 36 as the consolidated product 36 extrudes from containment die 4. For magnet-forming materials, electromagnetic coil 18 may deliver a selected magnetic field that aligns grains of the process material 2 along a selected crystallographic orientation or axis as the grains recrystallize. In various embodiments, strength of the applied magnetic field may be selected in the range from about 100 Oe to about 5000 Oe.

Extrusion Dies and Shapes

Extrusion dies of the present invention may include orifices and dimensions that deliver extrusion structures with selected shapes including complex shapes. Shapes include, but are not limited to, e.g., round, oval, circular, square, rectangular, triangular, pentagonal, hexagonal, octagonal, ellipsoidal, trapezoidal, rhombal, including combinations of these various shapes. Complex shapes include, but are not limited to, e.g., spherical, tetrahedral, pyramidal, pentagonal, pentagonal pyramidal, irregular, orthahedral, icosahedral, dedecahedral, stars, cones, boat-shape ovals, parallelograms, rounded rectangles, chevrons, round left, round right, bent arrows, arrows, double arcs, curved, obround, single-D, double-D, long-D, quad-D, letters, numerical, alpha-numerical, symmetrical shapes, non-symmetrical shapes, oblong shapes, rings, pictoral shapes, other non-standard shapes, including, e.g., embedded shapes such as, e.g., ovals within a square, squares within an oval, and like embedded shapes.

All shapes and structures as will be selected by those of ordinary skill in the art in view of the disclosure are within the scope of the present invention. No limitations are intended.

Fabrication Process

The present invention also includes a process for frictional consolidation fabrication of consolidation products described herein. In the process, a selected process material may be compressed under a selected compression load. The selected material may be rotated in the compression direction at a selected rotation speed to apply a rotational shear force that frictionally consolidates the selected material and yields grains of a selected size below about 5 microns. The grains are aligned along a selected crystallographic axis. The process material may be optionally subjected to a magnetic field at selected field strengths to promote alignment of material grains before or during consolidation, and/or to promote alignment of grains along selected crystallographic directions following consolidation. The process material or the consolidated process material may be optionally subjected to ultrasound at selected ultrasonic frequencies and strengths to promote alignment of grains in the material before or during consolidation, and/or to promote alignment of the grains along selected crystallographic directions following consolidation. The ultrasound may be delivered with a magnetic field or without a magnetic field. The consolidated process material may be optionally extruded to form selected extrusion structures. The process material may be optionally cooled to promote recrystallization during consolidation processing. Components of the selected process material may be optionally mixed together to form a homogenous mixture prior to consolidation processing of the selected materials.

Fabrication of Permanent Magnets

Fabrication of permanent magnets in accordance with the present invention may include compressing selected magnet-forming materials introduced into the containment die (FIG. 1). The material may be compressed under a compression load and/or rotated in concert with a compression and rotating (plunge) rod (FIG. 1) described previously herein.

In some embodiments, compression and/or rotation of the material and post consolidation cooling may be performed in a magnetic field.

In some embodiments, compression and rotation may proceed with a compression load and a rotation speed selected to frictionally consolidate the magnet-forming material that forms the permanent magnet. Friction between the plunge tool and the particles in the containment die as well as friction between the particles may heat the process materials to the point that the materials become sufficiently soft to flow in a viscous flow or a plastic flow. In the flow state, friction still occurs between the plunge tool and the flowing magnet-forming materials, between flowing magnet-forming materials and any non-flowing particles, and among the non-flowing but rotating particles. Friction in the flow state is reduced compared to that among the solid particles. Consequently, temperature of the magnet-forming materials in the flow state attains an equilibrium state. The process is self-limiting because if temperatures are too high, materials become soft, frictional heat is reduced and temperature is reduced. Conversely, if temperatures are too low, frictional heat continues to drive a higher temperature until the temperature reaches the equilibrium. Magnet-forming materials in the form of green (unsintered) compacted or consolidated solids perform similarly.

In some embodiments, the maximum temperature experienced by the magnet-forming materials is below the recrystallization temperature. The original grains of the magnet-forming material are deformed and broken into smaller grains, which are rearranged forming a new microstructure. The formation of new grains does not involve nucleation and growth process, and the newly formed grains are strained. The newly formed microstructure may exhibit certain texture as the result of plastic deformation involving dislocation movement along the slip planes. The newly formed microstructure can be affected by the microstructure of the feedstock materials.

In some embodiments, the process may include compressing and extruding a magnet-forming material introduced into a containment die tool (FIG. 3). The magnet-forming material may be compressed under a compression load and/or rotated in concert with a compression and rotating containment die (FIG. 3) described previously herein which may be forced to flow through the hole in the containment die to complete the extrusion process.

Frictional consolidation and extrusion of the magnet-forming material may include cooling the magnet-forming material during or after the consolidation and extrusion process to control the size of the grains (<2 μm) formed during and after the recrystallization process, and use the stress-strain field and or magnetic field to control the textures of the most of the grains (>90%) formed during and after the recrystallization process. The obtained magnet is nearly fully dense with a green density that is greater than 99%.

Friction consolidation and extrusion of the present invention eliminates energy intensive steps of conventional magnet-forming methods, and achieves desired grain sizes and desired properties.

Dynamic Recrystallization

The system and process of the present invention provide dynamic recrystallization of particles and grains in the selected process materials during consolidation. The term "dynamic recrystallization" means particles and grains of the selected material are dynamically and continuously formed and/or resized under the selected compression load and continuously applied rotational shear forces at selected process conditions. Particles in the selected process material achieve a size during operation of less than about 200 nm, as the particles and grains are dynamically changed during consolidation processing. The process yields a new crystal structure with particle grains aligned along a selected crystallographic axis. The term "recrystallization" as used herein means the original grains of the feedstock material are replaced with new grains that have a different size, shape, and crystalline orientation. The process of recrystallization is accompanied with a new grain nucleation and growth from the original grains of the feedstock. Recrystallization of the grains of the process material occurs at temperatures below the melting temperature. This permits the process materials to be plastically-deformed during processing and not melted. Composition of the consolidated material remains the same as the starting (unprocessed) material.

Particle Size and Grain Size

Materials selected for consolidation process of the present invention may be composed of particles of various and/or different sizes, and particles with the same and/or different shapes. The term "particle" refers to an individual object within the selected material. A particle may be amorphous or may contain one or more grains. The term "grains" refers to crystallites whose constituent atoms, molecules, or ions are arranged in an ordered pattern that extends in all three spatial dimensions.

Particles and grains in the starting materials may be dynamically consolidated over a wide range of sizes. Starting materials may include coarse particles of a size ≥1000 microns. Consolidation may proceed using a range of particles with sizes of ≥1000 microns down through particles of a fine size (≤10 microns) and further down to a particle size of zero (0 microns) that achieves an amorphous texture.

In some embodiments, particles and grains of the process material may be consolidated from a size greater than 1000 microns down to a size of less than or equal to about 10 microns. In some embodiments, particles and grains of the process material may be consolidated from a size greater than 1000 microns down to a size of less than or equal to about 5 microns. In some embodiments, particles and grains of the process material may be consolidated from a size greater than 1000 microns down to a size of less than or equal to about 1 micron. In some embodiments, particles and grains of the starting process material may be consolidated from a size greater than 1000 microns down to a size of less than or equal to about 0.1 micron. In some embodiments, particles and grains of the process material may be consolidated from a size greater than 1000 microns down to a grain size of zero (i.e., amorphous). The system and process may also yield particles and grains with sizes selected within any of these various ranges. Thus, no limitations are intended.

Grain Orientation (Texture)

"Texture" as used herein refers to the crystallographic orientation of constituent grains present within consolidated materials and consolidated polycrystalline materials. To achieve the desired texture and grain sizes, particles may be aligned. In some embodiments, friction consolidation of magnet-forming materials yields permanent magnets with grains of a selected size and a selected texture. Grains may be textured such that the crystallographic orientation is along the magnetic easy axis or parallel to the magnetic easy axis. The magnetic easy axis is an energetically favorable orientation that allows spontaneous magnetization of consolidated magnet-forming materials. "Spontaneous magnetization" means ferromagnetic materials in the selected magnet-forming material have an ordered spin state (magnetization) in the absence of an applied magnetic field at a temperature below the Curie temperature. Consolidated magnet-forming materials may thus exhibit certain textures because new grains grow along preferred crystallographic orientations under the influence of a stress-strain field and a magnetic field when applied. The newly formed microstructure is independent of the microstructure of the feedstock materials. In general, friction consolidation and extrusion of the present invention overcome grain size limitations imposed by conventional metallurgical processes.

Exchange Coupling of Hard and Soft Phases

High-energy product permanent magnets require both magnetically hard and magnetically soft phases to be homogeneously exchange-coupled at the nanoscale. For hard and soft phases to be fully exchange-coupled, the hard and soft phases must be homogeneously mixed. The present invention can readily mix hard and the soft phases together homogeneously via stirring followed by subsequent dynamic flows and recrystallization of selected magnet-forming materials during friction consolidation process and optional extrusion. In various embodiments, grain sizes of hard and soft phases of less than about 500 nm and about 30 nm may be achieved, respectively. In an exemplary process material feedstock containing $Nd_{12.8}Fe_{63.8}BDy_{5.9}Y_{6.4}Co_{8.1}Ti_{1.6}C_{0.4}$, grain sizes less than 100 nm were obtained (detailed further in reference to FIG. 9B).

Compression Load

Compression loads suitable for use in concert with the present invention are not limited. Selected materials may be compressed under a compression load delivered by the compression (plunge) tool described previously herein. Compression loads may be selected that frictionally heat and consolidate the selected process materials in the containment die.

In various embodiments, compression loads may be selected between about 50 psi (0.35 MPa) and about 500,000 psi (3447.4 MPa). In some embodiments, compression loads may be selected between about 50 psi (0.35 MPa) and about 10,000 psi (68.9 MPa). In some embodiments, compression loads may be selected between about 10,000 psi (68.9 MPa) and about 50,000 psi (344.7 MPa). In some embodiments, compression loads may be selected between about 50,000 psi (344.7 MPa) and about 100,000 psi (689.5 MPa). In some embodiments, compression loads may be selected between about 100,000 psi (689.5 MPa) and about 200,000 psi (1378.9 MPa). In some embodiments, compression loads may be selected between about 200,000 psi (1378.9 MPa) and about 500,000 psi (3447.4 MPa). In some embodiments, compression load is selected in the range from about 10 MPa to about 1 GPa. No limitations are intended.

Rotation Speeds

The present invention provides continuous rotation of selected process materials to apply rotational shear forces to the selected materials at selected rotation speeds during processing. Rotation speeds for rotation of selected process materials are not limited. In various embodiments, rotation speeds may be selected up to about 1000 rpm. In some embodiments, rotation speeds may be selected between about 10 rpm to about 1000 rpm. In some embodiments, rotation speeds may be greater than or equal to about 100 rpm. In some embodiments, rotation speed may be between about 50 rpm and about 500 rpm. In some embodiments, the process may include rotating the ram at a rate between about 500 rpm and about 1000 rpm. No limitations are intended. Rotation speeds for rotatable plunge tools and the containment die are also not limited.

In some embodiments, the process may include mixing components of the selected materials together prior to compressing and/or rotating the materials. For example, hard magnetic materials and soft magnetic materials of the magnet-forming material may be mixed to form a homogeneous mixture prior to compression and rotation processing so that magnetically hard particles may be uniformly surrounded with magnetically soft particles prior to compressing or rotating the magnet-forming material. Mixing that achieves the desired homogeneity may include stirring selected material components at selected rotation speeds described herein.

Process Temperatures

Temperatures for consolidation of selected process materials and for consolidation of magnet-forming materials may vary. In some embodiments, process temperatures may be selected in the range from about 250° C. to about 1200° C. For magnet-forming materials that yield permanent magnets, process temperatures may be selected at or above 500° C. However, no limitations are intended. In some embodiments, maximum temperature experienced by magnet-forming materials is above the recrystallization temperature. Deformed grains in the original material are replaced by newly formed grains that are non-deformed, that nucleate, and that grow until original grains in the process material are consumed. Aligned grains may metallically bond. For permanent magnets, grain sizes generally below 100 nm are preferred as coercivity increases with a decreasing grain size. However, once a critical grain size (threshold) is reached (which differs for each selected material), coercivity rapidly decreases with each decreasing grain size. For NdFeB, the size threshold is between about 20 nm to about 30 nm. No limitations are intended by the discussion of the exemplary material.

Extrusion Rates and Temperatures

Friction consolidation and extrusion of the present invention is rapid For example, extrusion of consolidated magnet-forming materials may be performed at extrusion rates preferably between about 0.1 m/min to about 1000 m/min. Diameters of extruded permanent magnets of the present invention may range between about 0.001 meters to about 0.5 meters. Extruded permanent magnets may include desired regular and/or irregular shapes.

Extrusion temperatures are not limited. Temperatures may be selected that maximize shear on the face of the billet, plastic deformation of the selected billet materials, microstructure refinement, and other physical and mechanical properties. In some embodiments, extrusion may be performed at temperatures above about 100° C. In some embodiments, extrusion may be performed at temperatures between about 100° C. and about 500° C. In some embodiments, extrusion may be performed at temperatures between about 500° C. and about 1000° C. In some embodiments, extrusion may be performed at temperatures above about 1000° C. In some embodiments, extrusion may be performed at temperatures below about 100° C. In some embodiments, extrusion may be performed at temperatures between about 0° C. and about −100° C. In some embodiments, extrusion may be performed at temperatures between about −100° C. and about −196° C. (the temperature of liquid nitrogen). No limitations are intended. In other embodiments, temperatures may be selected that are identified from equilibrium phase diagrams of the selected alloys or the billet materials being processed. No limitations are intended.

Cooling

Consolidated process materials of the present invention including consolidated magnet-forming materials, and consolidated, extruded magnet-forming materials may be rapidly cooled at rates up to about 100° C./min to provide grains of selected sizes detailed herein. For example, cooling may be performed on consolidated and extruded materials when recrystallization occurs during processing, or immediately after recrystallization. Cooling may be achieved using cooling systems capable of delivering or spraying cooling media such as water, nitrogen gas, $CO_2$ gas, liquid $N_2$, or liquid $CO_2$ onto the extruded materials (as described previously in reference to FIG. 3).

Figure 4:
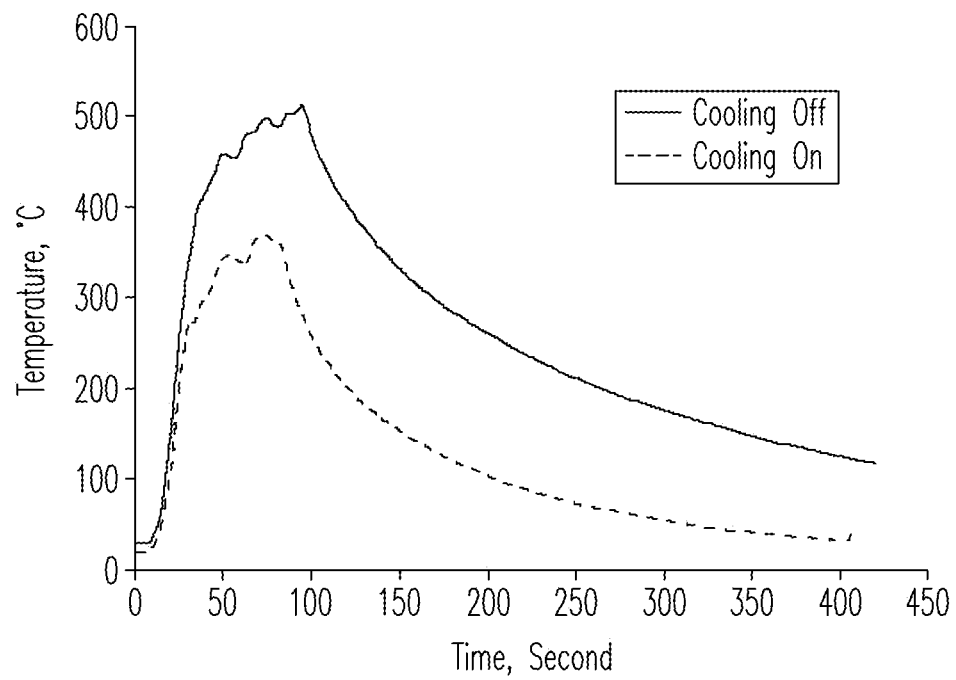
FIG. 4 shows an exemplary temperature profile of the containment die with and without cooling.

Feedstock materials can decompose at various process temperatures into undesirable phases. Thus, temperature of the containment die is important. Temperatures of the consolidation process may be controlled so that decomposition temperatures are not reached. For example, for $Nd_2Fe_{14}B$ phase material, if processing temperatures are higher than 1100° C., the material decomposes to a $Nd_2Fe_{17}B$ phase material that has unsuitable magnetic properties. FIG. 4 shows a typical temperature profile of the containment die (FIG. 1 and FIG. 2) for a representative material (e.g., $Nd_{12.8}Fe_{63.8}BDy_{5.9}Y_{6.4}Co_{8.1}Ti_{1.6}C_{0.4}$) during a 60 second consolidation run with and without die cooling. In the figure, peak temperature difference with and without cooling operation was 135° C.

Coercivity, Remanent Magnetization, and Energy Product

Permanent magnets formed by the present invention may exhibit coercivity values greater than 5000 Oe, remanent magnetization values greater than 7000 G (Gauss), and energy product values greater than 10 MGOe.

EXAMPLES

The following examples provide a further understanding of various aspects of the present invention.

Example 1

Friction Consolidation and/or Extrusion as a Replacement to Conventional Sintering Feedstock particles were obtained by crushing and grinding melt-spun ribbons of $Nd_{12.8}Fe_{63.8}BDy_{5.9}Y_{6.4}Co_{8.1}Ti_{1.6}C_{0.4}$. The die tool of FIG. 1 was used to frictionally consolidate the feedstock powder. A containment die with a 1-inch (2.54 cm) inner diameter was used. A plunge tool composed of tungsten rhenium (WRe) with a 1-inch (2.54 cm) outer diameter and a 6-inch (15.2 cm) length was used. About ~50 gram of feedstock powder was introduced into the containment die. Chilled water was circulated inside the die fixture that secures the containment die at a temperature of 15° C. and a flow rate of 4 G/min (15.1 L/min). The plunge tool applied a compression load of 10,000 pound-force (lbf) to the feedstock powder in the containment die while rotating the feedstock powder at a rotation speed of 125 rpm for 125 seconds before disengaging. The resulting consolidated magnet was allowed to cool to room temperature and was then removed from the containment die by removing the tungsten base plug from the containment die and then separating the consolidated magnet from the base plug. The containment die reached a maximum temperature of about 370° C. as measured by a thermal couple. The consolidated magnet had the shape of a hockey puck. The puck was opened in half by cross-sectioning along the direction of the compressive load. Electron Backscattering Diffraction (EBSD) analysis was carried out at a spot close to the outer edge of the cross-sectioned puck.

Figure 5:
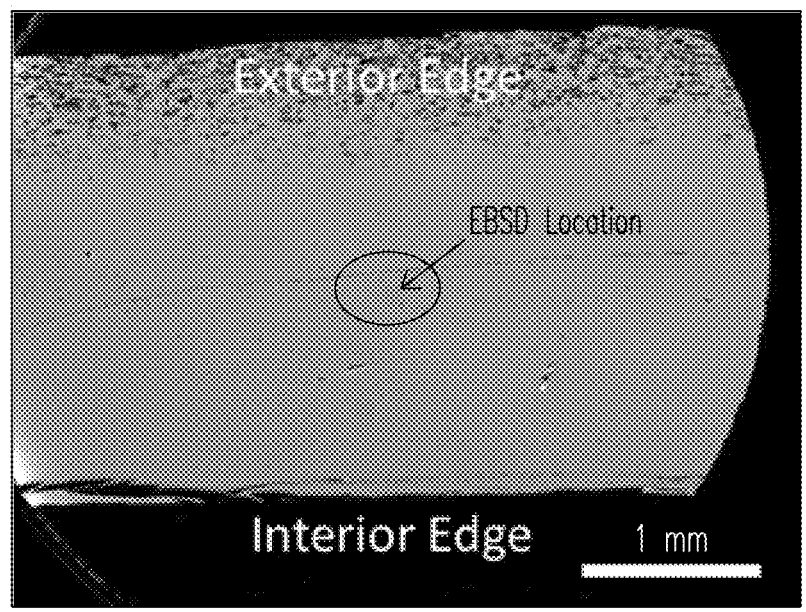
FIG. 5 is an optical image showing a cross sectional view of a friction consolidated permanent magnet (puck) made from a NdFeB-based powder.

FIG. 5 shows an optical image of cross-sections of the consolidated magnet. The interior edge is the side where the plunge tool contacted the powders. The exterior edge is the side where the powder contacted the tungsten base plug. The optical image shows a majority of the magnet is fully dense. The layer nearest the tungsten base plug was not fully consolidated in order to easily separate the processed magnet from the base plug of the die tool assembly. However, during actual manufacturing, this layer can be fully consolidated by adjusting the processing parameters such as load and processing time. In the figure, the Electron Backscatter Diffraction (EBSD) location is where texture analysis was performed using Electron Backscatter Diffraction.

Figure 6:
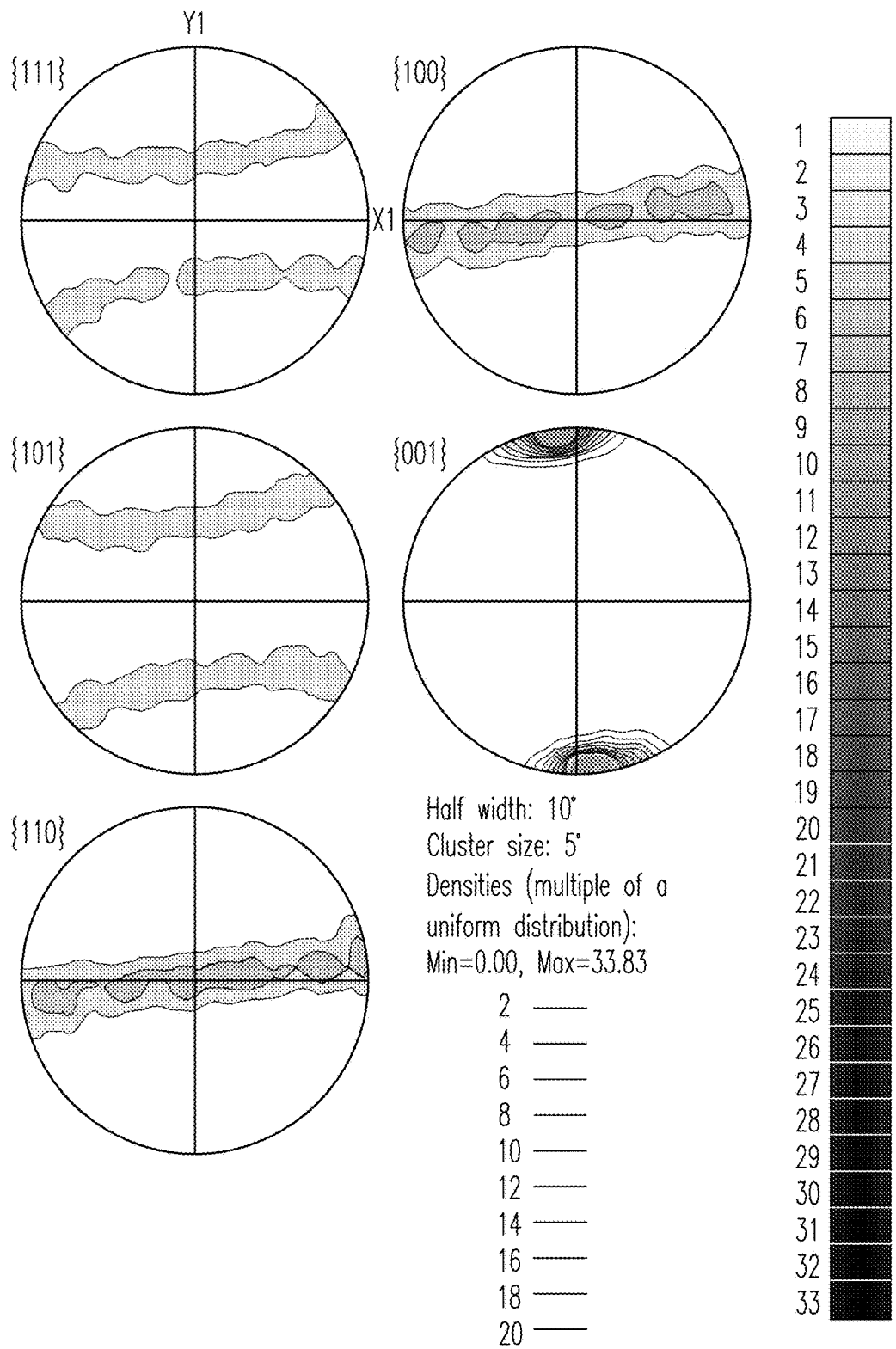
FIG. 6 shows pole figures of the consolidated permanent magnet (puck) of FIG. 5. The preferred texture from the test area is {001} type.

FIG. 6 shows five pole figures generated from EBSD analysis of the consolidated permanent magnet of FIG. 5. Pole figures show the density of specific grain orientations with respect to the sample reference frame. For the set of pole figures shown, the center of the pole figure corresponds to the out of plane (z-direction) sample surface, the y-orientation of the sample is aligned vertically and the x-orientation horizontally. The large diffraction intensity on the north and south poles indicates the sample has >90% of grains with a preferred texture and a magnetic orientation aligned along the {001} pole (Y-axis).

Figure 7:
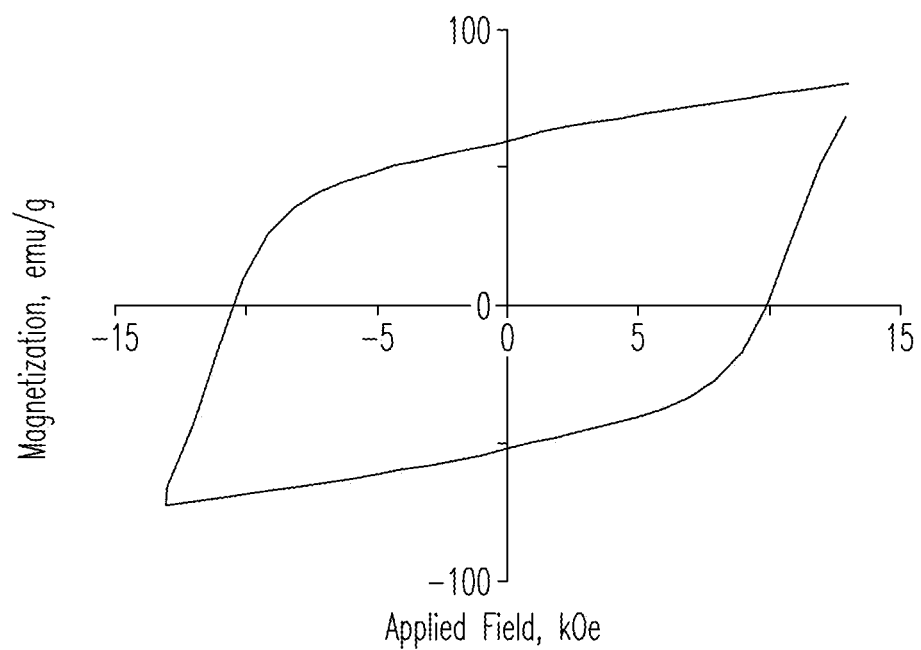
FIG. 7 is a plot of Magnetization (M) vs. Applied Magnetic Field (H) for a $Nd_{12.8}Fe_{63.8}BDy_{5.9}Y_{6.4}Co_{8.1}Ti_{1.6}C_{0.4}$ friction consolidated product sample.

FIG. 7 is a plot of Magnetization (emu/g) vs. Applied Magnetic Field (kOe) for a sample of a $Nd_{12.8}Fe_{63.8}BDy_{5.9}Y_{6.4}Co_{8.1}Ti_{1.6}C_{0.4}$ friction consolidation product (puck) processed without annealing that was cut from the outer edge, as shown in FIG. 5. The puck has a shape of a rectangular disk with dimensions: 4.04 mm×2.44 mm×0.97 mm. The surface normal is positioned along the radial direction of the consolidated magnet. The long edge of the puck is the direction of the applied field during the applied magnetic field measurement. The large coercivity (>1.1 Tesla) and high remanent magnetization (>60 emu/g) are close to magnets processed using conventional sintering.

Figure 8A:
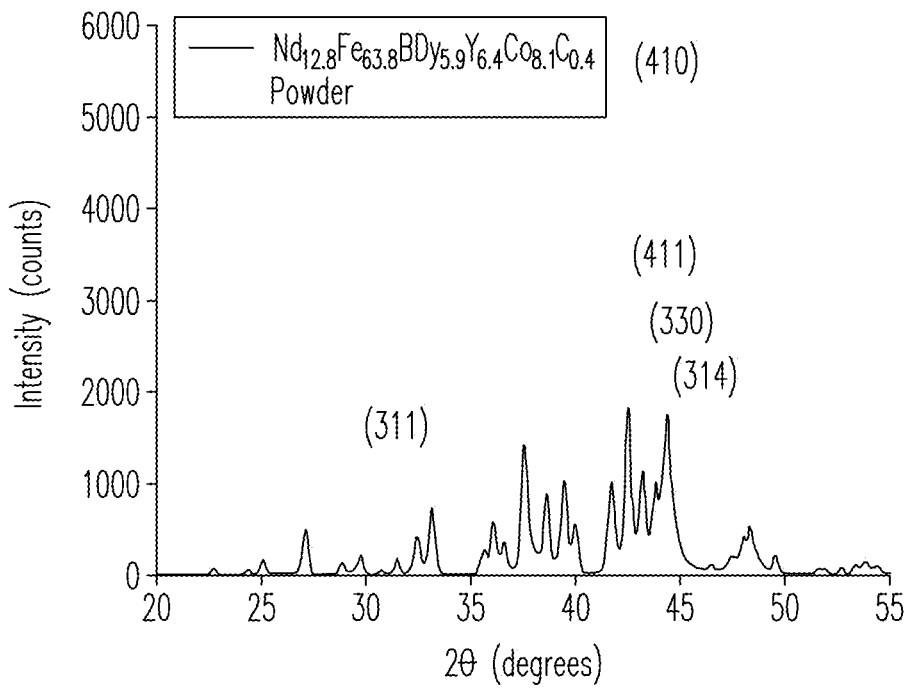
FIGS. 8A-8B show X-ray diffraction patterns of a magnet-forming material before and after friction consolidation of the present invention.
Figure 8B:
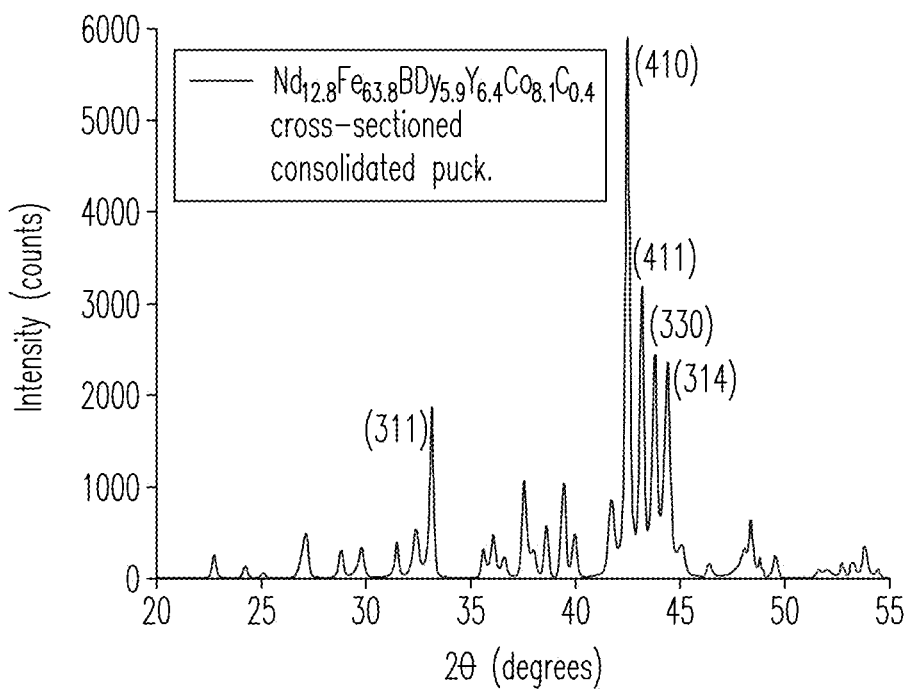

FIG. 8A and FIG. 8B show X-ray diffraction patterns of the magnet-forming material before and after friction consolidation. A cross-section of the consolidated magnet was taken along the direction of the applied compression load. X-ray diffraction was carried out at a spot close to the outer edge of the cross-sectioned puck. Results show that the 2θ locations for diffraction peaks of samples before and after friction consolidation are identical except for a small peak of the consolidated sample positioned at 45° corresponding to a trace quantity of an iron phase. Matched peak locations show that friction consolidation does not change crystal structure of the feedstock magnet-forming materials. Intensities of diffraction peaks can vary significantly, which indicates that strong changes in texture occur during processing of the selected magnet-forming materials.

Figure 9A:
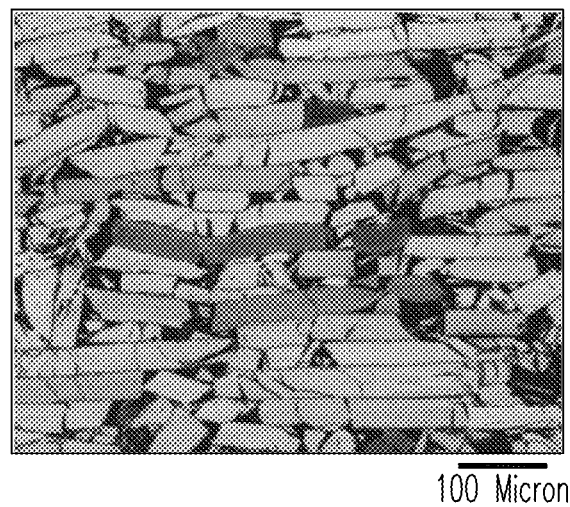
FIGS. 9A-9B are optical images showing the microstructure of magnet-forming materials before and after consolidation processing of the present invention.

FIG. 9A is an optical image of the exemplary magnet-forming material ($Nd_{12.8}Fe_{63.8}BDy_{5.9}Y_{6.4}Co_{8.1}Ti_{1.6}C_{0.4}$) prior to friction consolidation. The feedstock ribbons were crushed and ground. The feedstock ribbons had an average thickness of about 20 µm to ~30 µm, a length of about 50 µm to about 500 µm, and a width of about 50 µm to about 500 µm.

Figure 9B:
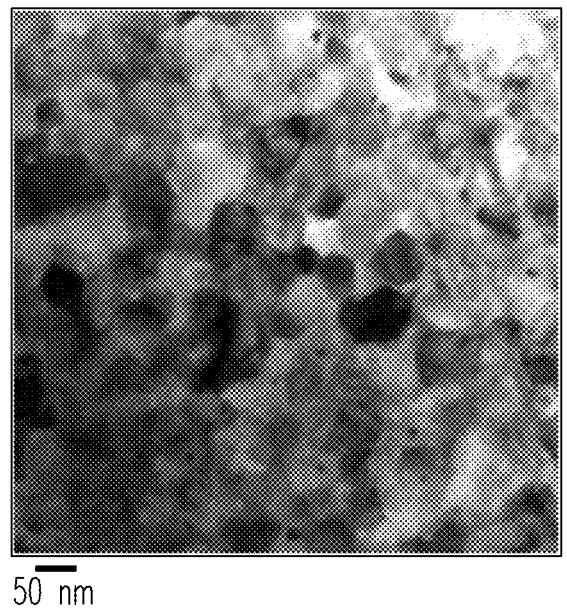

FIG. 9B shows a cross-sectional view of the microstructure of the permanent magnet formed by the present invention. Average grain size after friction consolidation from about 50 nm to ~80 nm. A comparison of FIG. 9A and FIG. 9B shows that the present invention successfully refines coarse particles in the feedstock from a starting size of >20 µm to ~30 µm to a grain size of about 50 nm to ~80 nm or better.

Example 2

Figure 10:
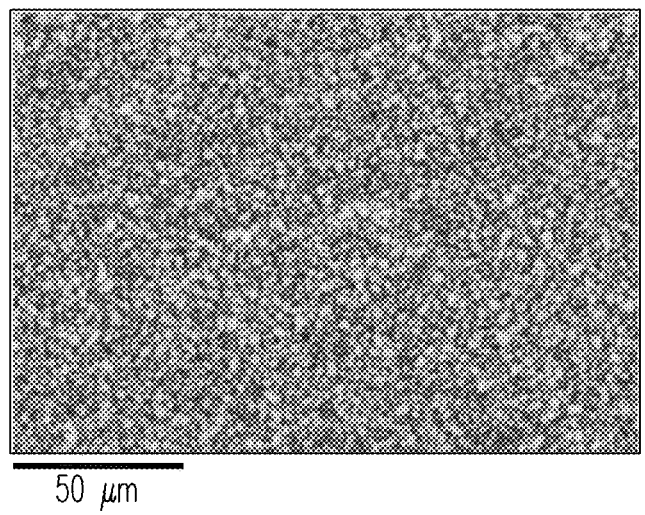
FIG. 10 is an SEM image showing a cross-section of an exemplary consolidated permanent magnet.
Figure 11:
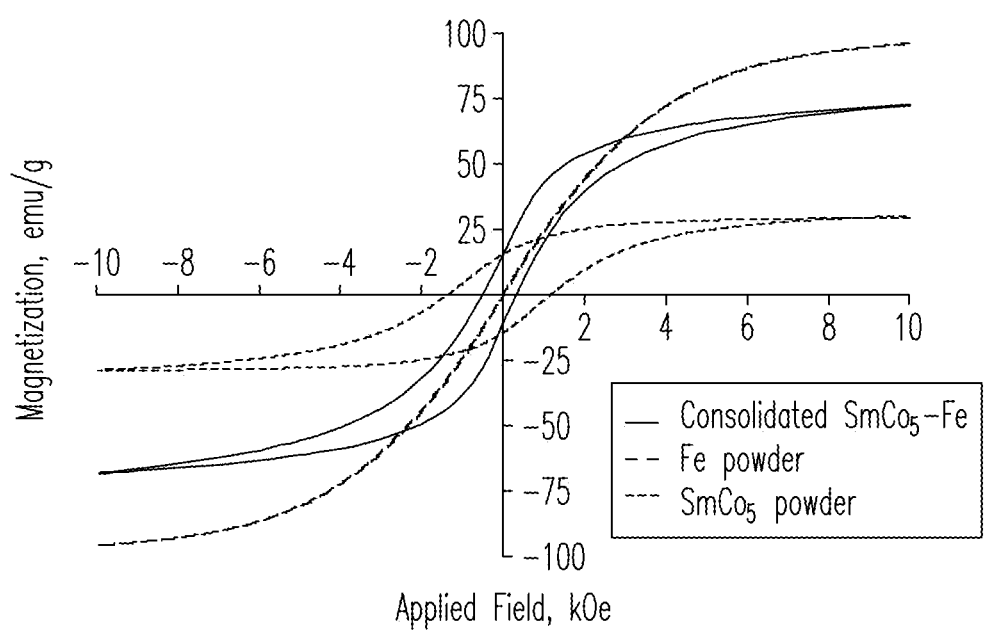
FIG. 11 is a plot of magnetization (M) vs. applied field (H) for an exemplary feedstock powder and the resulting consolidated magnet.

Consolidation of $SmCo_5$+Fe $SmCo_5$ powder (Catalog #42732) and iron (Fe) powder (Catalog #00170) were purchased commercially (Alfa Aesar, Ward Hill, Mass., USA). Powders were mixed in a weight ratio of [80:20]. Mixed powders were ball milled overnight at a rotation speed of 100 rpm to achieve homogeneity. The die tool of FIG. 1 was used to provide frictional consolidation of the SmCo5-Fe powder mixture. A containment die was used with a sample chamber with a 1-inch (2.54 cm) inner diameter. A plunge tool composed of a tungsten-rhenium (WRe) alloy with a 1-inch (2.54 cm) outer diameter (O.D.) and a 6-inch (15.2 cm) length was used. About ~50 gram of feedstock powder was introduced into the containment die. No cooling to the containment die was provided. The plunge tool applied a compression load of 5,000 pound-force (lbf) to the feedstock powder in the containment die while rotating the feedstock powder at a rotation speed of 125 rpm for 30 seconds before disengaging. Since the area is defined, the stress can be calculated as the load/area [load/area=$5000/(3.14*0.5^2)$=6396 psi]. Maximum temperature of the containment die during processing was about 350° C. as measured by thermal couple. The resulting consolidated magnet was allowed to cool to room temperature and was then removed from the containment die by removing the tungsten base plug from the containment die and then separating the consolidated magnet from the base plug. FIG. 10 shows SEM images of cross-sections of the consolidated magnet. Average grain size is about 2~5 microns. FIG. 11 plots magnetization vs. applied field (MH) for the feedstock powders and the consolidated magnet. Magnetizations of the feedstock SmCo5 and Fe powders are less than theoretical values due to impurities in, and oxidization of, purchased powders. The consolidated magnet had a measured magnetization of 72 emu per gram (emu/g) at an applied field of 10 kOe. The magnetization value matches the weighted average of magnetizations of both the feedstock powders $SmCo_5$ and Fe. Coercivity of the consolidated magnet was less than the value of the feedstock $SmCo_5$ powder, but higher than the value of the iron powder.

Example 3

Figure 12:
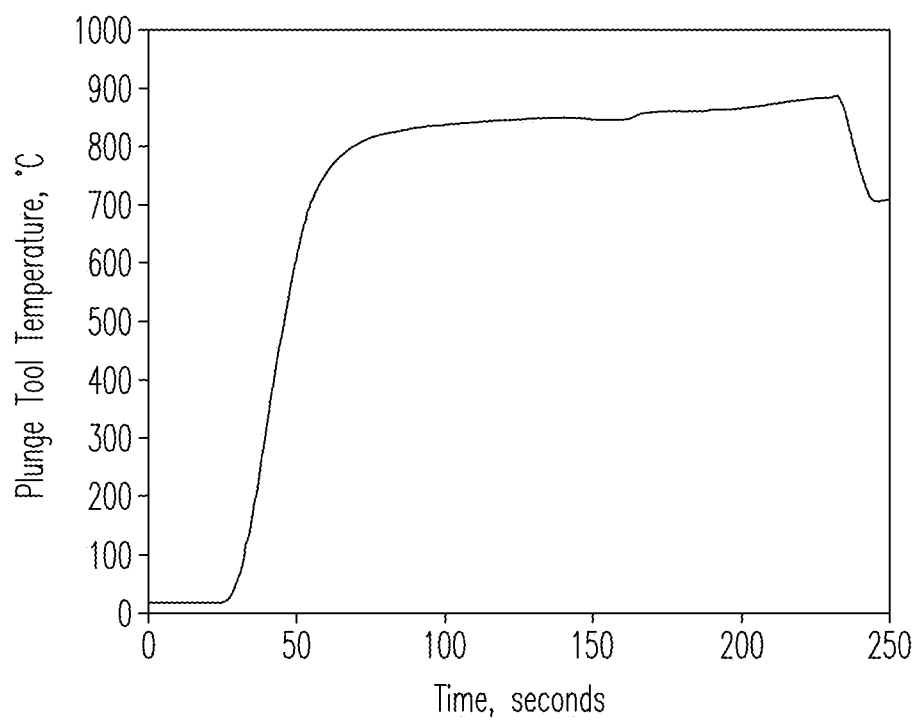
FIG. 12 is a plot of tool temperature as a function of time during consolidation operation.
Figure 13:
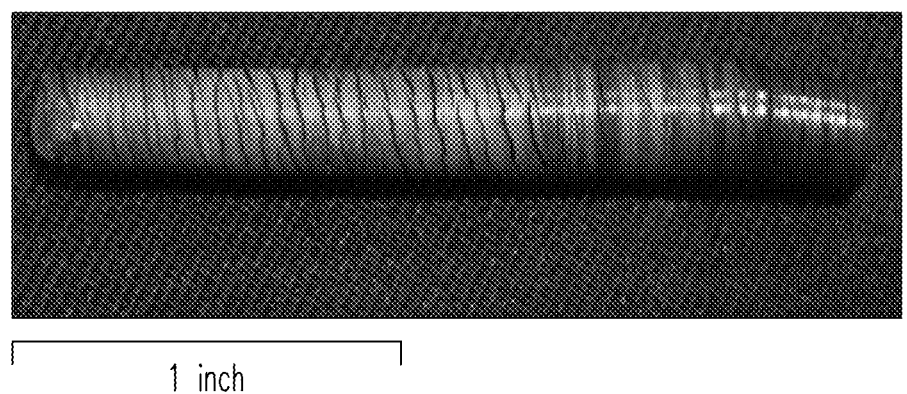
FIG. 13 is a photograph of an extruded friction consolidated permanent magnet of the present invention.
Figure 14:
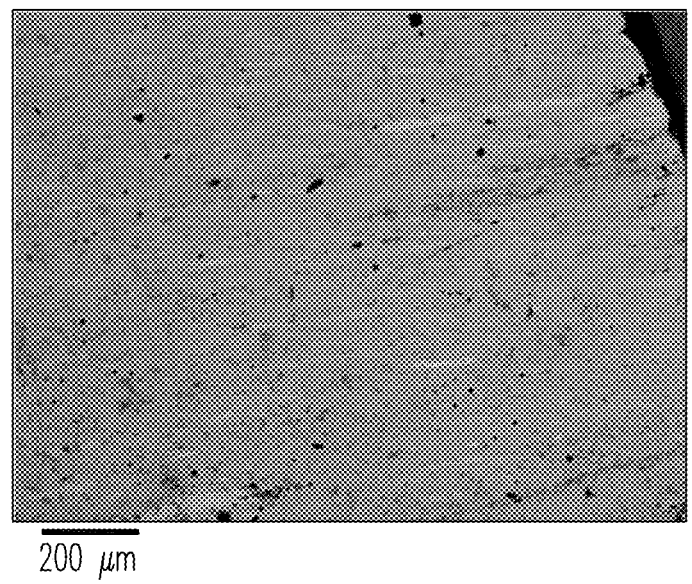
FIG. 14 is an optical image showing a cross sectional view of the texture of the extruded magnet of FIG. 13.
Figure 15:
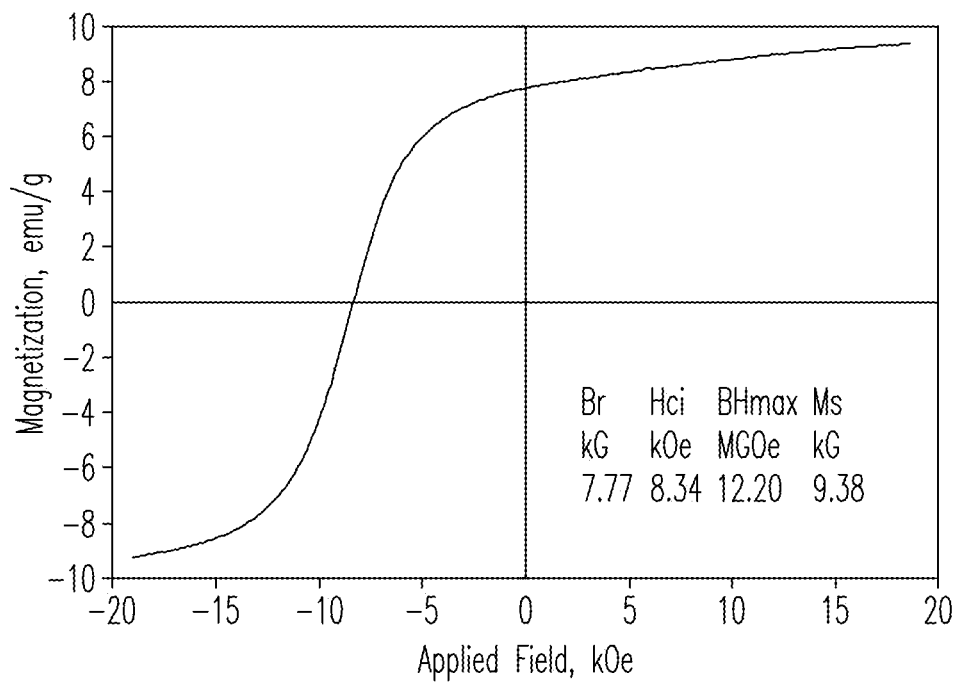
FIG. 15 is a plot of the magnetization (M) vs. applied field (H) for the extruded magnet of FIG. 13.

Consolidation of $Nd_{12.8}Fe_{63.8}BDy_{5.9}Y_{6.4}Co_{8.1}Ti_{1.6}C_{0.4}$ Powder with Backward Extrusion Feedstock powder was obtained by crushing and grinding melt-spun ribbons composed of $Nd_{12.8}Fe_{63.8}BDy_{5.9}Y_{6.4}Co_{8.1}Ti_{1.6}C_{0.4}$. The die tool of FIG. 2 was used to consolidate the feedstock powder. A containment die was used with a sample chamber with a 1-inch (2.54 cm) inner diameter. A plunge tool made of an INCONEL® alloy (e.g., INCONEL® 718) was used with a 1-inch (2.54 cm) outer diameter and a 6-inch (15.2 cm) length. About ~100 gram of feedstock powder was introduced into the chamber of the containment die. The plunge tool applied a compression load of 10,000 pound-force (lbf) to the feedstock powder while rotating the material at a speed of 125 rpm, which consolidated the feedstock powder. After consolidation, a new INCONEL® 718 plunge tool was installed that included a 1-inch (2.54 cm) outer diameter, a 6-inch (15.24 cm) length, and 0.2 inch (0.51 cm) extrusion hole. The new plunge tool applied a compression load of 20,000 pound-force (lbf) to the previously consolidated powder while rotating at a speed of 500 rpm, which extruded the previously consolidated powder through the extrusion hole in the plunge tool. Maximum temperature of the plunge tool during processing was about 850° C. as measured by a wireless thermal couple that was inserted in the extrusion plunge tool. FIG. 12 shows the temperature profile of the plunge tool during a 200 second consolidation run performed in concert with die cooling. FIG. 13 shows a photograph of the extruded magnet. The magnet includes a length of about 2 inches (5.1 cm) and a diameter of about 0.2 inches (0.51 cm). FIG. 14 is an SEM image that shows a cross-section of the extruded magnet. The image shows a flow pattern that indicates the existence of a desired texture in the extruded magnet. FIG. 15 is a plot of the magnetization (M) vs. applied field (H) for the extruded magnet.

While preferred embodiments of the present invention have been shown and described, it will be apparent to those of ordinary skill in the art that many changes and modifications may be made without departing from the invention in its true scope and broader aspects. The appended claims are therefore intended to cover all such changes and modifications as fall within the spirit and scope of the invention.

What is claimed is:

1. A permanent magnet forming process, the process comprising the steps of:

compressing a hard magnetic material and a soft magnetic material together within a magnetic field while rotating both in at a rotation speed and temperature sufficient to homogenously mix and frictionally consolidate the hard and soft materials while exchange coupling the hard and soft magnetic materials together within the magnetic field; and cooling the consolidated magnetic material in a magnetic field to align grains of the exchange coupled materials along a selected axis therein.

2. The process of claim 1 further including the step of extruding the cooled consolidated magnetic material to form permanent magnet structures with selected shapes prior to cooling same.

3. The process of claim 1 further comprising the step of adding a grain size controlling agent to the hard and soft materials prior to compression and rotation, the agent selected from the group consisting of Cu, Nb, Y, TiC, Dy, and B.

* * * * *